(12) United States Patent
Lu et al.

(10) Patent No.: US 10,013,824 B2
(45) Date of Patent: Jul. 3, 2018

(54) AUDIO DATA PARSING METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 597 days.

(21) Appl. No.: 14/764,313

(22) PCT Filed: Jan. 14, 2014

(86) PCT No.: PCT/CN2014/070595
§ 371 (c)(1),
(2) Date: Jul. 29, 2015

(87) PCT Pub. No.: WO2014/117646
PCT Pub. Date: Aug. 7, 2014

(65) Prior Publication Data
US 2015/0371466 A1 Dec. 24, 2015

(30) Foreign Application Priority Data
Feb. 1, 2013 (CN) .......................... 2013 1 0040757

(51) Int. Cl.
*G10L 19/16* (2013.01)
*G07C 9/00* (2006.01)

(52) U.S. Cl.
CPC ........ *G07C 9/00007* (2013.01); *G10L 19/167* (2013.01)

(58) Field of Classification Search
CPC ..... G10L 19/167; H04S 3/008; G06F 17/3074
USPC .......................................................... 340/5.6
See application file for complete search history.

(56) References Cited

U.S. PATENT DOCUMENTS

| | | | |
|---|---|---|---|
| 8,249,882 B2 | 8/2012 | Makiuchi et al. | |
| 2002/0071491 A1* | 6/2002 | Sugiyama | H04N 19/00 375/240.23 |
| 2003/0182001 A1* | 9/2003 | Radenkovic | H04L 12/6418 700/94 |

* cited by examiner

Primary Examiner — Vernal Brown
(74) Attorney, Agent, or Firm — Hammer & Associates, P.C.

(57) ABSTRACT

An audio data parsing method, comprising: a parsing device receiving audio data (101) to obtain data pending parsing; revising the data pending parsing to obtain revised data pending parsing (105); conducting a first decoding for the revised data pending parsing to obtain a first decoded data (106); determining whether the decoded data pending parsing contains header data (107), and if yes, then obtaining data length, and obtaining a corresponding data unit (111) in the first data according to the obtained data length; when all corresponding data units are successfully obtained, conducting a second decoding for the obtained data units, obtaining the corresponding byte data according to the decoding result and checking the corresponding byte data, otherwise storing the received audio data in a first data buffer, and continuing to receive audio data. The method improves the audio data parsing efficiency and accuracy, and can be widely used in digital communication between both parties engaged in headset communication.

17 Claims, 9 Drawing Sheets

AUDIO DATA PARSING METHOD

FIELD OF THE INVENTION

The present invention relates to communication field, especially relates to a method for parsing audio data.

PRIOR ART

A smart key device is a small type of hardware device with a processor and a memory, which is used in fields such as identity identification, software protection. The smart key device is connected with a computer via data communication interface of the computer. However, with the development of cell phone technology, the cellphone substitutes computer as for its function.

At present, there is no effective way to implement digital communication on the cellphone using the smart key device.

SUMMARY OF THE INVENTION

The object of the present invention is to provide a method for analyzing audio data, the smart key device is audio key which is built in a cellphone. The smart key device performs communication with the cellphone via earphone interface and the communication is not limited to digital communication between the cellphone and the smart key device and is suitable for any kind of digital communication based on earphone communication between two parties.

Therefore, the present invention provides a method for parsing audio data, which specifically comprises:

Step A, receiving, by a parsing device, audio data, determining whether data exist in a first data buffer, if yes, forming audio data received this time and the data in the first data buffer into data to be parsed; otherwise, taking the audio data received this time as data to be parsed;

Step B, shaping the data to be parsed to obtain the shaped data to be parsed;

Step C, decoding the shaped data to be parsed to obtain a first time decoded data;

Step D, determining whether head data is contained in the data to be parsed according to the first time decoded data, if yes, executing Step E; otherwise, if data exist in the first data buffer, clearing the data in the first data buffer and going back to execute Step A; if no data exist in the first data buffer, going back to execute Step A directly;

Step E, obtaining data length, obtaining a corresponding data unit in the first data according to the obtained data length;

Step F, determining whether all of the corresponding data units are obtained successfully, if yes, executing Step G; otherwise, storing the audio data received this time in the first data buffer; going back to execute Step A; and Step G, performing a second time decoding on the obtained data units, obtaining corresponding byte data according to decoding result; checking whether the rest byte data is correct according to the last byte data, if yes, outputting the rest byte data; otherwise, if data exist in the first data buffer, clearing the data in the first data buffer and going back to execute Step A; if no data exist in the first data buffer, going to execute Step A directly.

Preferably, Step C specifically comprises:

1) taking the initial data in the shaped data to be parsed as the current data;

2) determining whether a next data adjacent to the current data exist, if yes, executing step 3); otherwise, executing step 5);

3) determining the product of the current data and the next data adjacent to the current data, if the product is 0, recording the value of the X-coordinate corresponding to one party, of which the value is 0, of the current data and the next data adjacent to the current data, executing step 4); if the product is more than 0, executing step 4); if the product is less than 0, determining a linear equation according to the coordinates corresponding to the current data and the next data adjacent to the current data, recording the value of the X-coordinates corresponding to an intersection point of the linear equation and the X-axis and executing step 4);

4) taking the next data adjacent to the current data as current data, going back to step 2);

5) taking every two adjacent recorded x-coordinates as a set, computing a result of the latter recorded X-coordinate minus the former recorded X-coordinate in the set and determining the result, if the result is in a first preset category, decoding the set to be a first value; if the result is in a second preset category, decoding the shaped data to be parsed to be a second value; if the result is in a third preset category, decoding the shaped data to be parsed to be a third value.

Preferably, determining whether the head data is contained in the data to be parsed according to the first time decoded data comprises:

determining whether data accorded with a first format exist in the first decoded data, if yes, the head data is contained in the data to be parsed; otherwise, the head data is not contained in the data to be parsed.

Preferably, the data accorded with the first format is consecutive the first values of which the number is no less than a preset number.

Preferably, performing the second time decoding comprises: decoding the second value into 1 and decoding the third value into 0.

Preferably, Step D further comprises, when the head data is not contained in the data to be parsed, storing part of data at the end of the data to be parsed in the first data buffer.

Preferably, Step F further comprises, when obtaining all of the corresponding data units is not successful, storing the data length and storing the data, which can not be parsed to be one byte, at the end of the first time decoded data in a second data buffer;

Correspondingly, Step E specifically comprises

Step E1, determining whether data exist in the second data buffer, if yes, go to Step E2; otherwise, go to Step E3;

Step E2, forming the first time decoded data and the data in the second data buffer into a first data, obtaining the stored data length and executing Step E4;

Step E3, taking the first decoding data as the first data, obtaining the data unit corresponding to the data length in the first time decoded data and performing the second time decoding on the data unit, obtaining data length by computing according to the decoding result and executing Step E4;

Step E4, obtaining a corresponding data unit in the first data according to the data length; when the rest byte data is incorrect, Step G further comprises: checking the second data buffer; if data exist in the second data buffer, clearing the data in the second data buffer and deleting the stored data length.

Preferably, Step C, Step D, Step E, Step F and Step G are replaced with Step C', determining whether head data is contained in the data to be parsed according to the shaped data to be parsed, if yes, executing Step D'; otherwise, if the data exist in the first data buffer, clearing the data in the first data buffer and going back to execute Step A, if no data exist in the first data buffer, going back to execute Step A directly;

Step D', obtaining decode width data in the shaped data to be parsed and computing the decode width;

Step E', obtaining the data length and obtaining corresponding data in the first data according to the obtained data length;

Step F', determining whether all of the corresponding data is obtained successfully, if yes, executing Step G'; otherwise, storing the audio data received this time into the first data buffer and going back to execute Step A; and Step G', decoding the obtained data according to the decode width, obtaining corresponding byte data according to the decoding result; checking whether the rest byte data is correct according to the last byte data; if yes, outputting the rest byte data, otherwise, if data exist in the first data buffer, clearing the data in the first data buffer and going back to execute Step A; if no data exist in the first data buffer, going back to execute Step A directly.

Preferably, when the head data is not contained in the data to be parsed, Step C' further comprises storing part data at the end of the data to be parsed in the first data buffer.

Preferably, if all of the corresponding data units are not obtained successfully, Step F' further comprises: storing the data length and storing the data, which can not be parsed into one byte of data, at the end of the first time decode data into the second data buffer;

Step E' specifically comprises:

Step E1', determining whether data exist in the second data buffer, if yes, executing Step E2', otherwise, executing Step E3';

Step E2', forming the shaped data to be parsed and the data into the second data buffer into the first data, obtaining the stored data length and executing Step E4';

Step E3', taking the shaped data to be parsed as the first data, obtaining the data length in the shaped data to be parsed and decoding the data length according to the decode width, obtaining the data length by computing according to the decoding result and executing Step E4'; and Step E4', obtaining corresponding data in the first data according to the data length;

when the rest byte data is not correct, Step G' further comprises: checking the second data buffer, clearing the data in the second data buffer if data exist in the second data buffer and deleting the stored data length.

Preferably, determining whether the head data is contained in the data to be parsed according to the shaped data to be parsed comprises:

1) taking the initial data of the shaped data to be parsed as the current data;

2) determining whether the next data adjacent to the current data exist, if yes, executing step 3); otherwise, the head data is not contained in the data to be parsed.

3) determining the product of the current data and the next data adjacent to the current data, if the product is equal to 0, executing step 4); if the product is less than 0, executing step 5); if the product is more than 0, taking the next data adjacent to the current data as the current data, going back to execute step 2);

4) initializing a first counting value as 2, determining whether data accorded with a second format exist by looking for the data accorded with the second format from the next data of the data of one party, of which the value is 0, of the current data and the next data adjacent to the data, if yes, the head data is contained in the data to be parsed; otherwise, the head data is not contained in the data to be parsed; and 5) initializing the first counting value as 1, determining whether the data accorded with the second format exist in the next data adjacent to the current data, if yes, the head data is contained in the data to be parsed; otherwise, the head data is not contained in the data to be parsed.

Preferably, the step 4) comprises initializing the first counting value as 2; the step 5) comprises initializing the first counting value as 1;

determining whether the data accorded with the second format exist by look for the data accorded with the second format from the beginning of some data, wherein the some data is the next data of the data of one party, of which the value is 0, of the current data and the next data adjacent to the current data, or the next data of the current data comprises:

a) initializing a second counting value as 0 and taking the some data as the current data;

b) determining whether the next data adjacent to the current data exist, if yes, executing step c); otherwise, the data accorded with the second format does not exist;

c) determining the product of the current data and the next data adjacent to the current data, if the product is 0, executing step d); if the product is more than 0, executing step e); if the product is less than 0, executing step f);

d) adding 1 to the first counting value and determining the first counting value, if the first counting value is in a fourth preset category, adding 1 to the second counting value and executing step g); if the first counting value is in the fifth preset category, executing step h), otherwise, executing step 4) again;

e) adding 1 to the first counting value and executing step g);

f) determining the first counting value, if the first counting value is in the fourth preset category, adding 1 to the second counting value, and executing step g), if the first counting value is in the fifth preset value, executing step h); otherwise, executing step 5) again;

g) taking the next data adjacent to the current data as the current data, going back to execute step b);

h) determining whether the second counting value is less than the preset value, if yes, the data accorded with the second format do not exist; otherwise, the data accorded with the second format exist.

Preferably, the Step D' specifically comprises:

1) taking the initial data after the head data in the shaped data to be parsed as the current data;

2) determining whether the next data adjacent to the current data exist, if yes, executing step 3), otherwise, storing the audio data received this time in the first data buffer, going back to execute Step A;

3) determining the product of the current data and the next data adjacent to the current data, if the product is equal to 0, executing step 4); if the product is less than 0, executing step 5); if the product is more than 0, executing step 7);

4) recording the x-coordinate corresponding to one party, of which the value is 0, of the current data and the next data adjacent to the current data, executing step 6);

5) determining linear equation according to the coordinates corresponding to the current data and the next data adjacent to the current data, recording the x-coordinate corresponding to an intersection point of the linear equation and x-axis; executing step 6);

6) determining whether the number of the recorded x-coordinates is equal to 16, if yes, executing step 8); otherwise, executing step 7);

7) taking the next data adjacent to the current data as the current data, going back to execute step 2); and 8) computing an average value of the first 4 x-coordinates and the last 4 x-coordinates and taking the average value as a first decode width, computing an average value of the 8 x-coordinates in the middle and taking the average value as a second decode width.

Preferably, obtaining the data length data in the shaped data to be parsed and decoding the data length data according to the decoding width comprises:

s1) obtaining the initial data after the decoded width data in the shaped data to be parsed and taking the initial data as the current data;

s2) determining whether next data adjacent to the current data exists, if yes, executing step s3); otherwise, storing the audio data received this time in the first data buffer, going back to execute Step A;

s3) determining a product of the current data and the next data adjacent to the current data, if the product is equal to 0, executing step s4); if the product is less than 0, executing step s5); if the product is more than 0, executing step s7);

s4) recording the x-coordinate corresponding to one party, of which the value is 0, of the current data and next data adjacent to the current data, executing step s6);

s5) determining the linear equation according to the current data and the next data adjacent to the current data, recording the x-coordinate of the intersection point of the linear equation and the x-axis, executing step s6);

s6) determining whether number of the recorded x-coordinates is equal to 16, if yes, executing step s8); otherwise, executing step s7);

s7) taking the next data adjacent to the current data as the current data, going back to execute step s2); and s8) taking every two neighbored x-coordinates as a set, computing result of the latter x-coordinate minus the former x-coordinate, determining the result; if the result is in a sixth preset category, decoding the data to be parsed to be 1; if the result is in the seventh preset category, decoding the data to be parsed to be 0;

the sixth preset category is determined according to the first decode width, the seventh preset category is determined according to the second decode width.

Preferably, before the parsing device receiving the audio data, the method comprises: performing, by the parsing device, device initialization; determining whether device initialization is successful; if yes, creating recording thread and starting receiving audio data; otherwise, prompting that the device initialization is failed.

Preferably, shaping the data to be parsed comprises:

1) allocating a block of new memory of which the size is the same as the data length of the data to be parsed;

2) determining whether unprocessed data exist in the data to be parsed, if yes, executing step 3); otherwise, executing step 4);

3) obtaining a base line and determining whether obtaining the base line successfully, if yes, storing a different of the current data and the base line in the new memory and going back to execute step 2); otherwise, storing the current data in the new memory, going back to execute step 2); and 4) replacing the data to be parsed with the data in the new memory, obtaining the shaped data to be parsed and releasing the new memory.

Preferably, obtaining the base line specifically comprises:

obtaining a preset number of data before a current data and a preset number of data after the current data, looking for the maximum value and the minimum value in the obtained data and the current data, computing an average value of the maximum value and the minimum value and the average value is the base line.

The advantages of the present invention are that, by improving efficiency and hit rate of audio data parsing, the method can be widely used in digital communication between two parties based on earphone communication.

BRIEF DESCRIPTION OF THE DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described embodiments of the disclosure, other drawings obtained by those skilled in the art without any creative work belong to the scope of the disclosure.

DETAILED DESCRIPTION OF THE INVENTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the present invention.

Embodiment 1

Embodiment 1 provides a method for analyzing audio data. Combined with FIG. 1, the method is introduced as the following.

Figure 1:
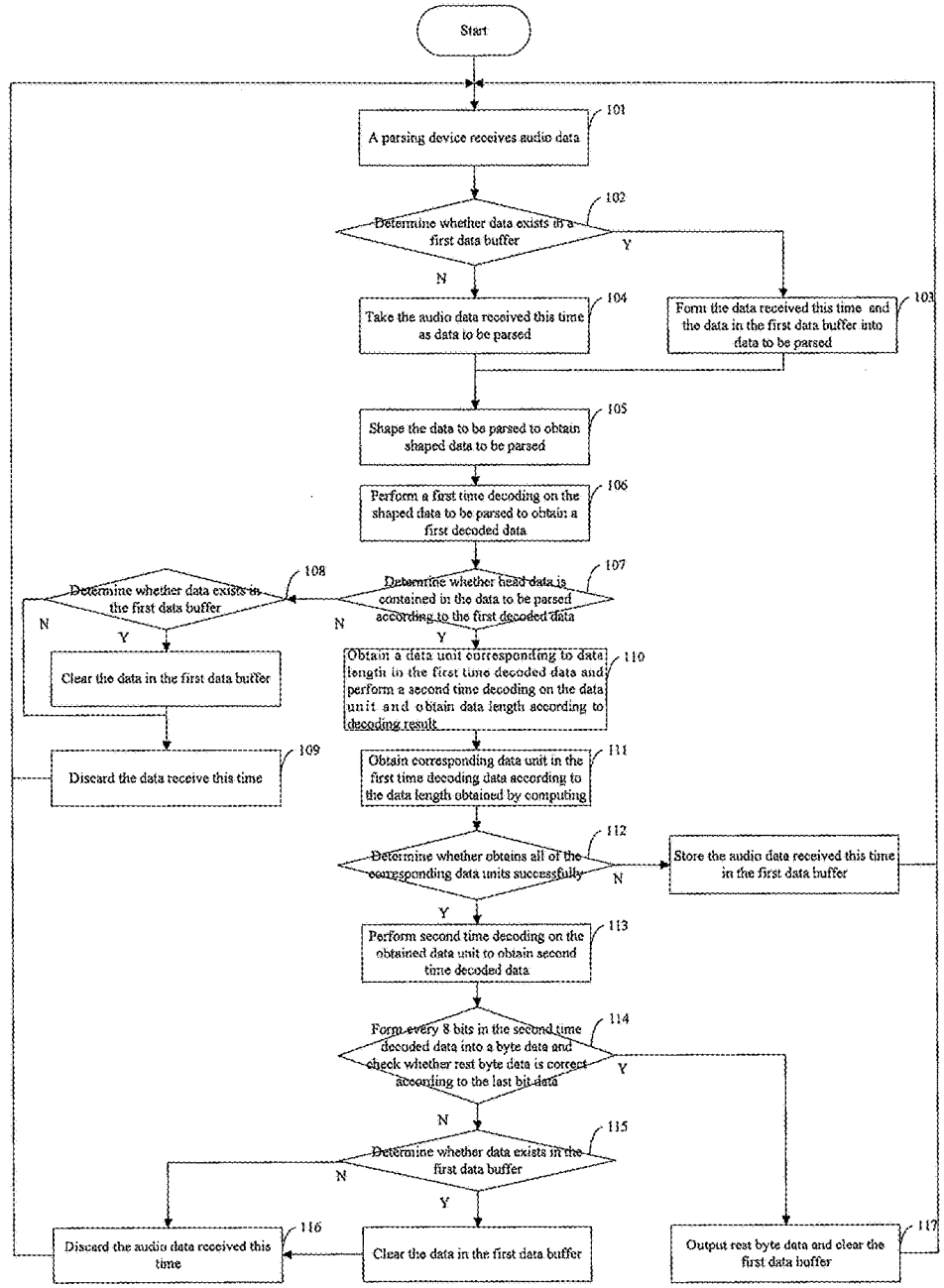
FIG. 1 is a flow chart of a method of parsing audio data provided by Embodiment 1 of the present invention.

As shown in FIG. 1, the method of analyzing audio data specifically comprises following steps.

Figure 2:
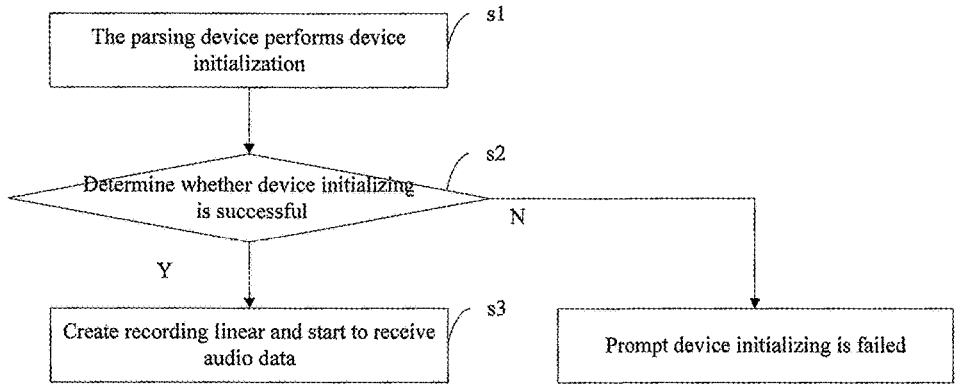
FIG. 2 is a flow chart contains steps before Step 101 in FIG. 1.
Figure 3:
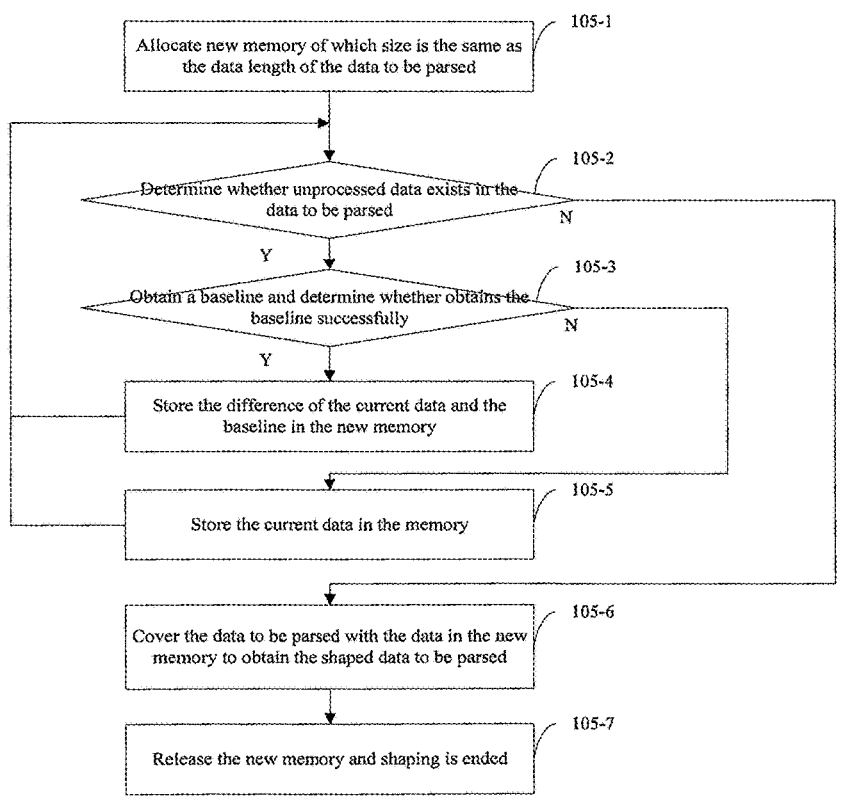
FIG. 3 is a specific flow chart of Step 105 in FIG. 1.

Step 101, an analyzing device receives audio data;

In the present embodiment, referring to FIG. 2, before receiving the audio data by the analyzing device, Step 101 further comprises:

Step s1, the parsing device performs device initialization;

Step s2, determine whether device initialization is successful; if yes, execute Step s3; otherwise, prompt that device initialization is failed;

Step s3, create recording thread and start receiving audio data; For example, in the present embodiment, the audio data received by the parsing device is: DE67D167FF270F0EB1127608E103A6FBADF639F7BC 67AF67A267956789677C676F6 762671625B50E80113E07560113FA7EF370F74E674267 356728671B670E670167F466702230 0FE70F5D054EFEBDF764EFA2F7E366D666C966BC66

AF66A36696668966E71FA30F5D0E
9F03D5FB4FF6E8ECBCF879666C665F66536646663966
2C661F66C31D0010B00C3902B9F9
29F540EA73FA11660466F765EA65DE65D165C465B76
591226C0E9D0D010175F921F408E9
0FFCA8659C658F658265766569655C65506570206D0E7
70C19FF54F8C6F17FE9E5F443653
66529651D6510650365F764EA64831D720F630AADFE0
BF611F1BCE62EF7DE64D264C564
B864AC649F64936486649D1BB50F840856FD3DF4A5
F02AE54EF97B646E64626455644964
3C6430642364C219FB0F0F0797FC01F37FF0DDE32BFC
18640C64FF63F363E663DA63CD6
3C1633A182010B205E9FB67F1FEEF3CE2BEFEB763A
A639E639263856379636C6360639B
162B1008042AFB56F0E6EFC9E0830156634A633E6331
63256318630C6300630E151C10250
232FAD7EEB8EFADDFC004F762EA62DE62D262C562
B962AC62A0628B132210C100C9F9
90ED84EF2ADE880898628B627F62736266625A624E62
41622C12A40F9BFEBBF876ECA0E
F4BDDE80B39622D62216215620862FC61F061E461BC
10DF0FBAFD5EF860EB45EFFBDB
3A0FDC61CF61C361B761AB619F6192618661A20F060
F89FB48F7D9E9CDEE86DA73127F
61736167615B614E61426136612A618F0E640EF7F98D
F6F9E8BCEE7AD97516236117610B6
1FF60F360E660DA60CE60860DD30D84F8C0F5CCE79
2EE9AD8E419C860BC60B060A460
98608B607F6073606A0CA30C92F6D4F495E606EE44D
73A1E6D606160556049603D603160
256019606D0EAF0B79F690F336E63DEDC9D6FE2013
600760FB5FEF5FE35FD75FCB5FBF
5F980DA80A39F545F259E5FBEBD9D6E716BB5FAF5
FA45F985F8C5F805F745F685F370C
B3090CF31EF172E32EEB2BD5221A655F595F4D5F41
5F355F295F1D5FEB5EE30A1508D6
F0D4EF00E252EA55D33D1E0F5F045FF85EEC5EE05E
D45EC85E755B96094B06BDEE58E
E36E052E9ECD17B22BC5EB05EA45E985E8C5E805E7
55E7A5884088F04C9EC61ECB3DE
31E843D07125695E5E5E525E465E3A5E2E5E235E0D5
51807CF0187EA18EB1FDDE4E68A
CEE629195E0D5E015EF65DEA5DDE5DD25D9F51E9
05290094E880E9BEDBACE54BCD1
B2ECA5DBE5DB25DA75D9B5D8F5D845D4A4E9C04
F3FDB2E6B0E720DA2AE401CCB43
17D5D715D655D5A5D4E5D425D375D464B47037FFB
7EE487E532D840E220CAE034315D2
65D1A5D0E5D035DF75CEB5C5448D401CCF858E286
E3B4D67FE0E8C89A38E85CDC5CD
05CC55CB95CAE5CA25C3B456D0027F6A9E017E14E
D5BEDD46C8BD39A05C6342FAF70
746845C5447E9F78341695C1E4102F716474D5C5E450
CF7F141325C933FD9F5D842175C1
D3D75F6C549FC5B1E421CF59846E15BD65BCA5BBF
5BB35BBE4613F56E51965B134060
F202477B5B705B645B595B4E5BA343E0FBFBEF2BD9
83DEB3C6E63E455B395B2E5B225
B175B7C409DFAB2ED5ED78BDCB3C588420F5B045
BF85AED5AE25A0342F3EE544CC75
ABB5AB05AA45A995A94394DEF4B4E7F5AC63DDE
F2F256635A575A4C5A415A365A3D
3982EE5E551B5A0F5A045AF959EE59943A9BEE8254
D359C759BC59B159A6593D3B57F0
95598A597F59735968595D590E3727EF3F58425937592
C592159165904358FF6D6EBCEDB0
2E0C3D19E530B59FD3307EFFA53F158A62D95EE5D55
D858CD58C258B758AC582032F7F
33DE615D814DA86CE2753A5586030DDEF95588A587
F58745869585E58472B62EC5058455
8E72C60EE37582C58EC2BC0EA1E58135835240BED06
58FB57432978EAED57E2572722D2
EAD657CB575D286CEEBD57B257C4247DE9A5579A
575F2749EC8D5782573D249EE5765
76B57A51FD9E85F57545705257AE647573C570A1D85
E8315726572D21DCE81A570F57142
14EE40357F85605196DE7EE56E356B51E9BE3D756C
D568017F9E3C256B756E51D13E8AC
56A1562E1BF5E197568C56815676566B5661569C1D67
E056564B56405636562B562056BC1
CEAE415560A564C1B8CE00056F555D612CFE3EC55E
155411824E0D755CD554411F6DFC
455B9557A0D10E4B055A5559B55905585557B55BC0F
6FE371556755C51152E75D555255C
90F55DD4A553F55310A75E237552C5529105DDD2455
19550F0886E112550755B91045D2E
8C52BBB77B810C221551655AD0735CEBEBFC9B704
B2E9BE3355295537025BDD2255185
S0D550255F854ED547D0738CC0DBBA1B5BBAA37C
60C550155AB016DDFFA54F0549302
38D8EA54DF54ACFAD8DDDA54CF54C454BA54AF54
A554BBFA4ADC9F5494547F0558C
37FB741ADEAA6E2BCB854AD549CF6CEDBA8549E5
4B8FC87D599548E54D3F411DB8A
547F541CFACCDB7A546F5465545A545054455410F32
CDB415436542C54215417540C5467
F338D90854FE5385F522BB4EAF3EA8C99E56C126541
B5411540654FC53F153EBE634DDE
E53E453EAF8C3B880ACA4A5269AFFC50D540254F8
53EE53E353D953E4E6CBE8D453CA
53C8E59DDEC753BC53E8E99AE1B853AE53A3539953
8E538453A7E03CE181537753C1E8
FCD874536A535F5355534A53405370DA02E73D533353
78E902B4969B9FD547533C53E7E1
33E239532F53A3E31ADF2C532253A5DB4EDB2153A
C4E65E7.

Step 102, determine whether data is in a first data buffer; if yes, execute Step 103; otherwise, execute Step 104;

Preferably, in the present embodiment, a setting identifier is configured to identify whether data is in the first data buffer. An agreement is made that setting of the identifier represents that data is in the first data buffer, resetting of the identifier represents that no data is in the first data buffer;

For example, in the present embodiment, no data is in the first data buffer.

Step 103, form the audio data received this time and the data in the first data buffer into data to be parsed, execute Step 105;

Step 104, take the audio data received this time as data to be parsed, and execute Step 105;

Step 105, shape the data to be parsed and obtain the shaped data to be parsed;

Preferably, in the present embodiment, referring to FIG. 3, shaping the data to be parsed and obtaining the shaped data to be parsed further includes:

Step 105-1, obtain a new memory of which the size is the same as the data length of the data to be parsed;

Step 105-2, determine whether unprocessed data is in the data to be parsed; if yes, execute Step 105-3; otherwise, execute Step 105-6;

Step 105-3, obtain base line; determine whether obtains the base line successfully; if yes, execute Step 105-4; otherwise, execute Step 105-5;

In this case, obtaining the base line further comprises: obtaining 5 data before and after a current data respectively; looking for a maximum value and a minimum value of the obtained data and the current data; computing average value of the maximum value and the minimum value; the average value is the base line;

Step 105-4, store a difference between the current data and the base line in the new memory, and go back to execute Step 105-2;

Step 105-5, store the current data in the new memory, and go back to execute Step 105-2; Step 105-6, replace the data to be parsed with the data in the new memory to obtain the shaped data to be parsed;

Step 105-7, release the new memory and shaping is ended;

In the present embodiment, the shaped data to be parsed is as the following:

B42FF2313DF6CADE6CE331D9A2D472CC79C705C8
88387B386E3861380F38442CF92
FE63242F432E103E4C8D9E6D3ADCC18C60ACAE839
DC39CF39C239BC37CF2BB230333
4FEF2F1E3AEE42BDA22D39ACC41C47FCCC03BB33
BA63B993B6D37032C5C313A3562F
1D8E598E4E0D91DD29FCC38C30CCFC93CBC3CAF3
CA33CAC36A52CDA31133605F0BD
E774E403DA8AD101CD18C24BD2E93DDC3DCF3DC2
3D9C35FA2B423201368CF5F9E631
E69BD916D2C9CCB0C1B7D4503E443E373E2A3E9B3
45A2C02335F36CCF4F3E603E5AC D7EDD065CA1
EC284CDE23DD53DC83DBC3DFC37302D063350376C
F28CE984E4D4D83
8D044CBEFC061D1113F053FF83EEB3EA636EE2D7F3
30538EFF0CAEAA0E378D865CFD3
CB58C07CD4A93F9C3F903F833F6535772EAE337238
58EFE8EB03E391D801CF85CCE3BF
31D81E4012400540F93FC533F52ED3330E3942EE0FE
DA7E2E5D869CE05CD43BFC5DBB
E40B140A54099404B329A2F02346639DFEC04EEE7E1
10D942CED7CDBABE74DF47413B
412F412241B9305B304E34F6390AECB3EEC3E0D6D8
81CD66CE5BBE6EE3A54198418C41
8041EA2EDD305334693A5AEBABEF50E05ED92BCD
23CFC9BD27E837422A421E421242
D62CC131AB34C73AB8EACCEFC9DEEFD8B0CCDE
CF89BD26EC77426B425F425342F82
A0332AB34243B02EADEF0BFDE69D971CC5AD010B
D4FF0F142E442D842CC423A29ED3
20735B83BDAE9EEF077DD3CD9D3CBCBD084BC71
F47D437143654359435D2987333635F
A3B65E900F199DC35D9A7CB6ED12CBC27F9D543C9
43BD43B1439F2913346F35633C21E
90DF1C4DB06D918CBE1D1E9BB33FD17440B44FF43
F343FF29DE34B735D13CCEE8B5F0
ABDAF3D8BACA2ED26CBB6202954489447D4471442
F2ABE342D36D43C2EEB2CF0FCD
A19D8C5CACFD15BBB9005A54499448D448144862A
3135A536153DF4EA4AEFE1D9F3D6
0DCAB1D08FBB9DFB714465445A444E44D52A1D360
E37DD3DB2EA58EFB7D8CFD629C
9E6D0E3BADAFF1D4511450545F944782B0C37873745
3E43EAD0EE97D79BD6CEC820D1
23BA0B05DD45D245C645BA45332CEE371A38DE3B0
5EAE5ED5DD6FED5E2C7FED098B
9270A68465C4650464446E72CBE38ED38CF39DFE928
ED68D505D55DC7DBD0EDB81B0E
13470847FC46F0461E2EB639B139553766E96DEB2BD
4C2D4CEC693D039B89513C847BC
47B047A547C92E883A823AC0340FE98FEA00D3F2D33
4C622D0C1B791184048344828481
D48BD2F513B4C3B6132B9E825E9EAD1EED261C56B
CF42B7F51CBE48B248A6489B48D
030453C403C7B3081E8C8E7CDD0DCD18AC498CE78
B6382189497E49724966490532333D
2C3D6D2EF3E7D7E569CF9DD0CCC397CD00B6B2250
04AF449E849DD493233E63DE03D
2C2C64E7A8E32FCEA3CEDBC24BCBD3B54A272D4
AF02F87E594334032831D26CEC017
A6325B174DCD611D98323D1CF9CDDE181F338016D
4CCD31912337614DCCD2C2163338
51990CC0C1E55334F335033453339339E1FF8CD592A8
7340A1965CB072080347534A93506
41FB408C32CFEAF0DE25C883CDB7B5EA2D494A3D
4A324A264AC641003027EA42DDF4
C626CC52B52732AE4AA34A974A8C4AE135021DF8C
95F27D735D135D335C7358F358A1
449CA4D298735D318F8CD0C32B533D735DA35CF35
C435CB1416CAF730BA35B335B635
AB359335391646CA33308935833585357A35913428164
8CB8C348634193515350A35FF34B
612D4CAF233FB34F534A036993E8E3E821F12E15FD6
5CC696CA5CBC373EA443961EA0
D9933E2135D609D2CA9A3115350A3538394140364071
1E4EE099D277C47BC6F1BA923F1
045CB1C48DC00454934FC35F935EE35E335D108F2C9
E535E035580BD8CCAF36A4366A0
A45C9A3369836E302C0CBBB36B036FE0739C9AE36
A336EE00A0C9A4366C36AE07C3C
D143709372004E0C80837FD36B708A8CDEC38E138A
10509C7E138D63815014FCAD5385
C3813068EC75B38503823FEA5C95138403768031DCB
5B3950395A039AC64F394439B0FB1
ECA9F3994396C0157C69339893941FAC0C689394F398
401B8CB513A463AD8FEA5C5473A
3C3AFD3AF73AEC3AE23A2302F3C4E83AE23ADC3A
D83ACD3A8038510184C9B43AAF3
AF6FF3CC5B03AA53ABFF7BDC8DA3ACF3A4CFD33
C5E63ADC3A59F610C5DE3AD33A
99F23FC9D33AB53807390139F638EC3832F3EAC6F23
8ED385DF8EFCDFA3BEF3B6BF6F
CC3F13BE63BDEF026C9E83BD93BDBF613C4DA3B
CF3B57F400D4EB4C3A4EF10979CB
1CBF5FB4ABB144BBAC4E84511B049ACA23BC2EB4
69AE4EBB98518E519CFEC0D9144
BD13B5D44EB4C974FFE54930754CC29BBBDB5D7A
A53C628551D55C70189DF59474E3E
F7EB9FC1513E463E18E447C7493E6E3B303C283C1D
3C133CA8EE29D6A253C756B70787
C5AEB970AF19A911BFE756DC56CBF8FDDDDB4B7F
3F9EE770C0823F773FC1DF01C67A
3FAAC4DE2FFC3AD3
C443C903C873C7D3C723C43DB64C37E3C783C6E3D6
53D5B3D50
3DBBEB7BD7D8558E5A1AFCAAC1D6B5C6AE51A5
DEC7AE5AA35A995A8E5A3E49443
B7CE0ECDC1957D35CDE01A9C166B58AAE0CA3E5
CEF35CE85CDE5CD45CDD46EF369
5CD81CF8F3A8A3A8DCC65C58F3A843AB5D068C88
63A773972396A395F39553952CAED
CA373D323D81D2BEC2363D2C3D263D1D3D123D4E3
CBAD687EFC75BC35B09F293BC2
7A430DED85BCD5B78EAC4EAC63EB93B5ECCD7C7
E93BDF3B67C411C4E43B6F372DD 0.

Figure 4:
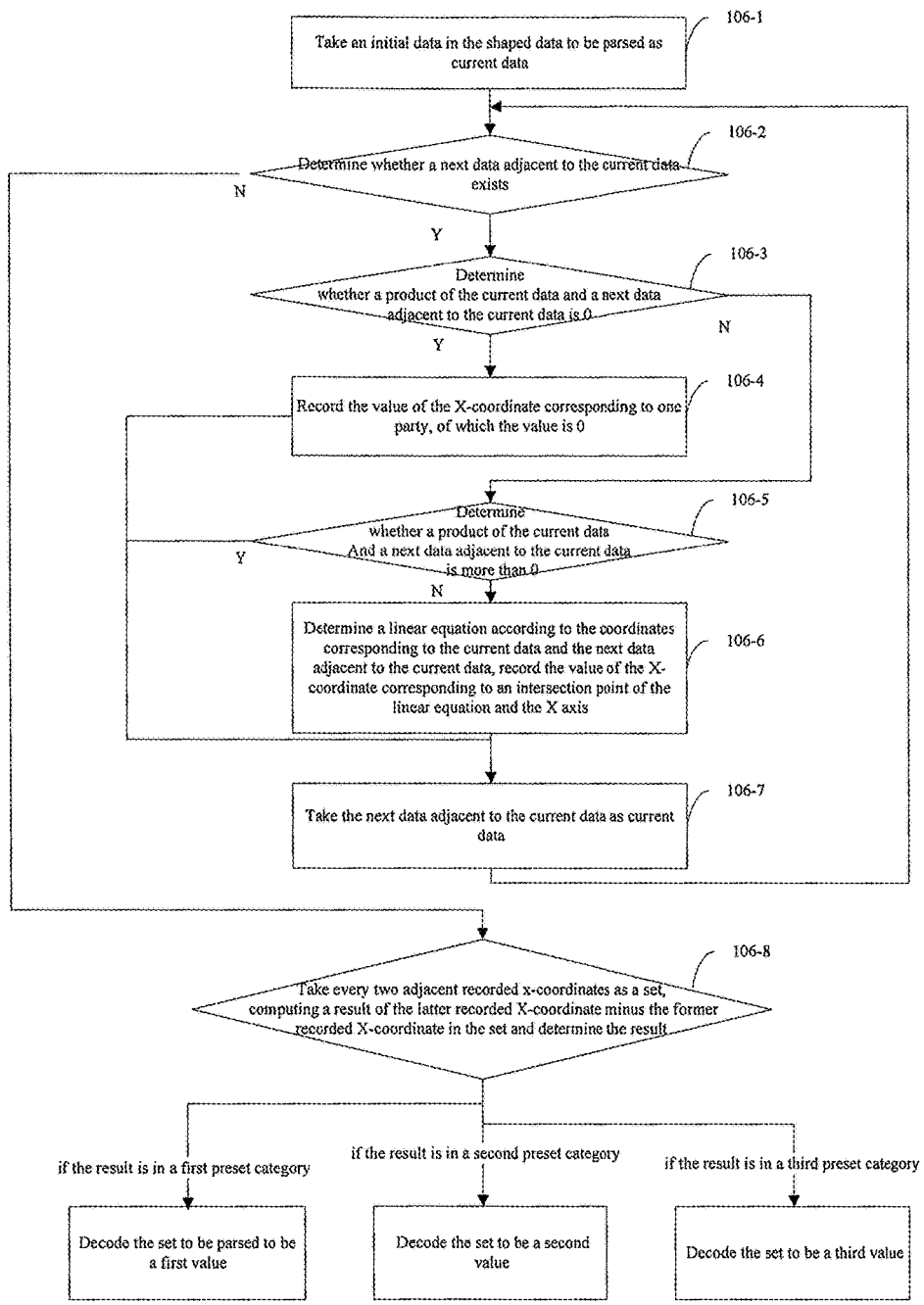
FIG. 4 is a specific flow chart of Step 106 in FIG. 1.

Step 106, decode the shaped data to be parsed for the first time to obtain a first time decoded data;

Further, decoding the shaped data to be parsed for the first time is decoding the width of wave corresponding to the shaped data to be parsed;

Preferably, referring to FIG. 4, decoding the shaped data to be parsed for the first time to obtain a first time decoded data further includes:

Step 106-1, take an initial data in the shaped data to be parsed as current data;

Step 106-2, determine whether a next data adjacent to the current data exist; if yes, execute Step 106-3; otherwise, execute Step 106-8;

Step 106-3, determine whether a product of the current data and a next data adjacent to the current data is 0; if yes, execute Step 106-4; otherwise, execute Step 106-5;

Step 106-4, record the value of the X-coordinate corresponding to one party, of which the value is 0, of the current data and the next data adjacent to the current data, execute Step 106-7;

Preferably, in Embodiment 1, an agreement that the X-coordinate corresponding to the initial data in the shaped data to be parsed is 0 is made;

Step 106-5, determine whether a product of the current data and a next data adjacent to the current data is more than 0; if yes, execute Step 106-7; otherwise, execute Step 106-6;

In the present embodiment, sequence of Step 106-3 and Step 106-5 can be exchanged and here is no limitation;

Step 106-6, determine a linear equation according to the coordinates corresponding to the current data and the next data adjacent to the current data, record the value of the X-coordinate corresponding to an intersection point of the linear equation and the X axis; execute Step 106-7;

Step 106-7, take the next data adjacent to the current data as current data, and go back to Step 106-2;

Step 106-8, take every two adjacent recorded x-coordinates as a set; compute a result of the latter recorded X-coordinate minus the former recorded X-coordinate in the set and determining the result, if the result is in a first preset category, decode the set to be parsed in the first preset range to be a first value; if the result is in a second preset category, decode the set to be a second value; if the result is in a third preset category, decode the set to be a third value;

For example, in the present embodiment, the first value is data unit 0x10, the second value is data unit 0x08 and the third value is data unit 0x04; in the present embodiment, the first decoding data obtained by decoding the shaped data to be parsed specifically is:

10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 10 04 04 04 04 04 04 04 04 04 04 10 08 10 08 10 04 10 04 04 04 10 04 10 04 10 04 10 04 10 08 04 04 04 04 10 08 04 04 10 04 04 04 04 04 04 04 04 04 04 04 04 04 04 04 04 04 04 04 04 04 04 04 04 04 04 04 04 04 04 04 04 04 04 04 04 04 04 04 10 04 10 04 04 04 04 04 04 04 04 04 10 04 04 04 04 04 04 04 04 04 04 04 04 08 04 08 04 04 10 08 04 04 04 04 04 10 04 04 08 04 04 04 04 04 04 04 10 04 10 04 04 08 10 04 04 08 10 04 04 04 04 04 10 04 04 04 10 04 04 04 04 04 00;

Step 107, determine whether head data is contained in the data to be parsed according to the first time decoding data, if yes, execute Step 110; otherwise, execute Step 108;

Preferably, determining whether head data is contained in the data to be parsed according to the first time decoding data specifically comprises: determining whether data of a first format exist in the first time decoded data; if yes, the data to be parsed contains head data; otherwise, the data to be parsed does not contain head data;

Specifically, in Embodiment 1, the data of a first format is no less than 15 consecutive data units 0x10;

Step 108, determine whether data is in the first data buffer; if yes, clear the data in the first data buffer and execute Step 109; otherwise, directly execute Step 109;

Step 109, discard the audio data received this time;

Preferably, Step 109 further includes storing part of data at the end of the data to be parsed in the first data buffer.

Step 110, obtain the data unit corresponding to the data length in the first time decoded data and performing the second time decoding on the data unit; obtaining data length by computing according to the decoding result;

Preferably, in order that the analyzing device can accurately segment head data, in the present embodiment, flag data is set between the head data in the audio data sent to the analyzing device and the data length data. For example, in the present embodiment, 2 data units 0x04 0x04 after the data accorded with the first format represents flag data; the data unit corresponding to the data length data in the first decoding data is 16 data units of 04 04 04 04 04 04 04 04 04 04 04 04 10 04 04 04 after the data unit representing flag data;

if all data units corresponding to the data length data cannot be obtained, store the audio data received this time in the first data buffer; go back to execute Step 101;

performing the second time decoding further is decoding the unit data 0x08 into 1, and decoding the unit data 0x04 into 0. For example, in Embodiment 1, performing the second time decoding on the data unit 04 04 04 04 04 04 04 04 04 04 04 04 10 04 04 04 to obtain data 0 0 0 0 0 0 0 0 0 0 0 0 1 0 0 0; in Embodiment 1, Little-Endian byte order is used for data importing, e.g. low bit is at the front and high bit is at the end; 0 0 0 0 0 0 0 0 is 0 0 0 0 0 0 0 0=0x00,0 0 0 0 1 0 0 0 is 0 0 0 1 0 0 0 0=0x10, the data length is 16 bits (128 bytes) which corresponds to 128 data units.

Step 111, obtain the corresponding data unit in the first decoding data according to the data length obtained by computing;

Specifically, in the present embodiment, the audio data sent to the analyzing device further contains checking data which corresponding to 8 data units at the end of the first decoded data; therefore, the corresponding data unit is 136 data units after the data unit corresponding to the data length data;

In Embodiment 1, the corresponding data unit is 10 08 10 08 10 04 10 04 04 04 10 04 10 04 10 04 10 04 10 08 04 04 04 04 10 08 04 04 10 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 04 10 04 10 04 04 04 04 04 04 04 04 04 04 04 10 04 04 04 04 04 04 04 04 04 04 04 08 04 08 04 04 10 08 04 04 04 04 04 10 04 04 08 04 04 04 04 04 04 04 04 10 04 10 04 04 08 10 04 04 08 10 04 04 04 04 04;

Step 112, determine whether all corresponding data units are obtained successfully; if yes, execute Step 113; otherwise, store the audio data received this time in the first data buffer and go back to execute Step 101;

Further, Step 110, Step 111 and Step 112 can be replaced with:

Step 110', determining whether data exist in a second data buffer; if yes, forming the first time decoded data and the data in the second data buffer into the first data; obtaining a stored data length and executing Step 111'; otherwise, taking the first time decoded data as the first data; obtaining the data unit corresponding to the data length in the first decoded data and obtaining the data unit, which corresponds to the data length, in the first decoded data and performing the second time decoding on the obtained data unit; obtaining the data length obtained by computing according to the decoding result and executing Step 111';

Step 111', obtaining the corresponding data unit in the first data according to the data length;

Step 112', determining whether all the corresponding data units are obtained successfully; if yes, executing Step 113; otherwise, storing the audio data received this time in the first data buffer, storing the data, which cannot be parsed into one byte, at the end of the first time decoded data in a second data buffer and storing the data length; going back to execute Step 101.

Step 113, obtain a second time decoded data by performing the second time decoding on the obtained data unit;

Further, the method of second time decoding is the same as that in Step 110; no more detail is given here;

In Embodiment 1, the second time decoded data obtained by performing the second time decoding on the obtained data unit is: 00000000 00001000 11111010 00101010 10110000 11001000 00000000 00000000 00000000 00000000 00001010 00000000 00100000 00000001 01001100 00001001 00000000 10100110 01100000;

Step 114, combine every 8 bits in the second time decoded data into a byte data and check whether the rest bytes are correct according to the last byte; if yes, execute Step 117; otherwise, execute Step 115;

Preferably, parity check is adopted in Embodiment 1; Further, when the result of the check is that the rest bytes are not correct, Step 114 further includes returning error prompting information to an upper computer;

In Embodiment 1, after combining every 8 bits in the second time decoded data into one byte, the obtained data is:

0x5f 0x54 0x0d 0x13 0x00 0x00 0x00 0x00 0x50 0x00 0x04 0x80 0x32 0x90 0x00 0x65 0x06, in which the last byte 0x06 is check bit.

Step 115, determine whether data exist in the first data buffer; if yes, clear the data in the first data buffer and execute Step 116; otherwise, execute Step 116 directly;

Step 115 further includes checking the second data buffer; if data exist in the second data buffer, clear the data in the second data buffer and delete the stored data length.

Step 116, discard the audio data received this time and go back to execute Step 101;

Step 117, output the rest bytes; clear the first data buffer and go back to execute Step 101.

Embodiment 2

Figure 5:
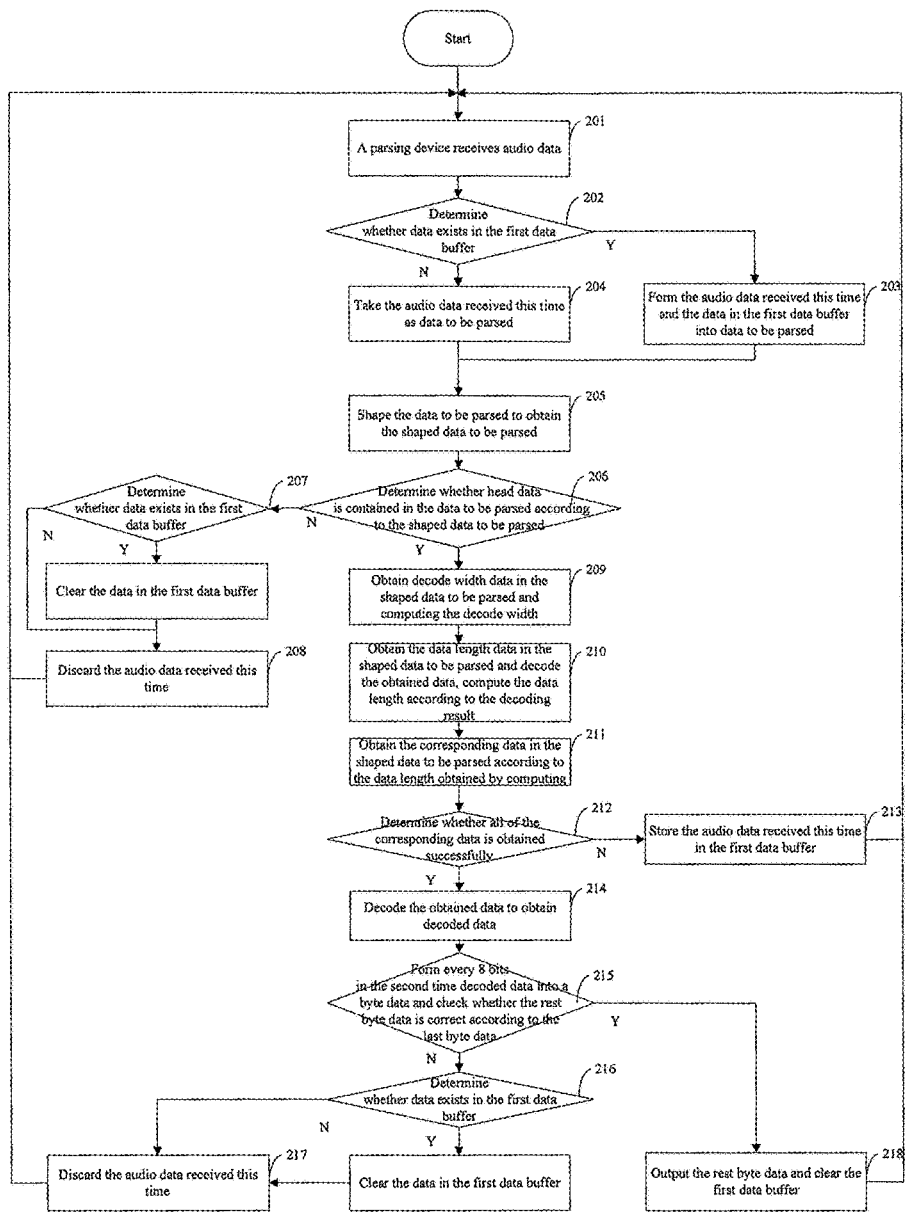
FIG. 5 is a flow chart of a method for parsing audio data provided by Embodiment 2 of the present invention.

Embodiment 2 of the present invention provides a method for analyzing audio data. Referring to FIG. 5, the method includes:

Step 201, a parsing device receives audio data;

In Embodiment 2, before Step 201 that the parsing device receives the audio data, the method further includes:

Step s1, the parsing device performs device initialization;

Step s2, determine whether device initialization is successful; if yes, execute Step s3; otherwise, prompt that device initialization is failed;

Step s3, create recording thread and start to receive audio data.

Step 202, determine whether data exist in the first data buffer; if yes, execute Step 203; otherwise, execute Step 204;

Preferably, in Embodiment 2, setting identifier is configured to identify whether data exist in the first data buffer, wherein setting of the identifier is for identifying that data is in the first data buffer, resetting of the identifier is for identifying that no data is in the first data buffer;

Step 203, form the audio data received this time and the data in the first data buffer into data to be parsed, execute Step 205;

Step 204, take the audio data received this time as data to be parsed, execute Step 205;

Step 205, shape the data to be parsed to obtain the shaped data to be parsed;

Preferably, in Embodiment 2, the method for shaping the data to be parsed is the same as that in Embodiment 1; no more detail is given here.

Figure 6:
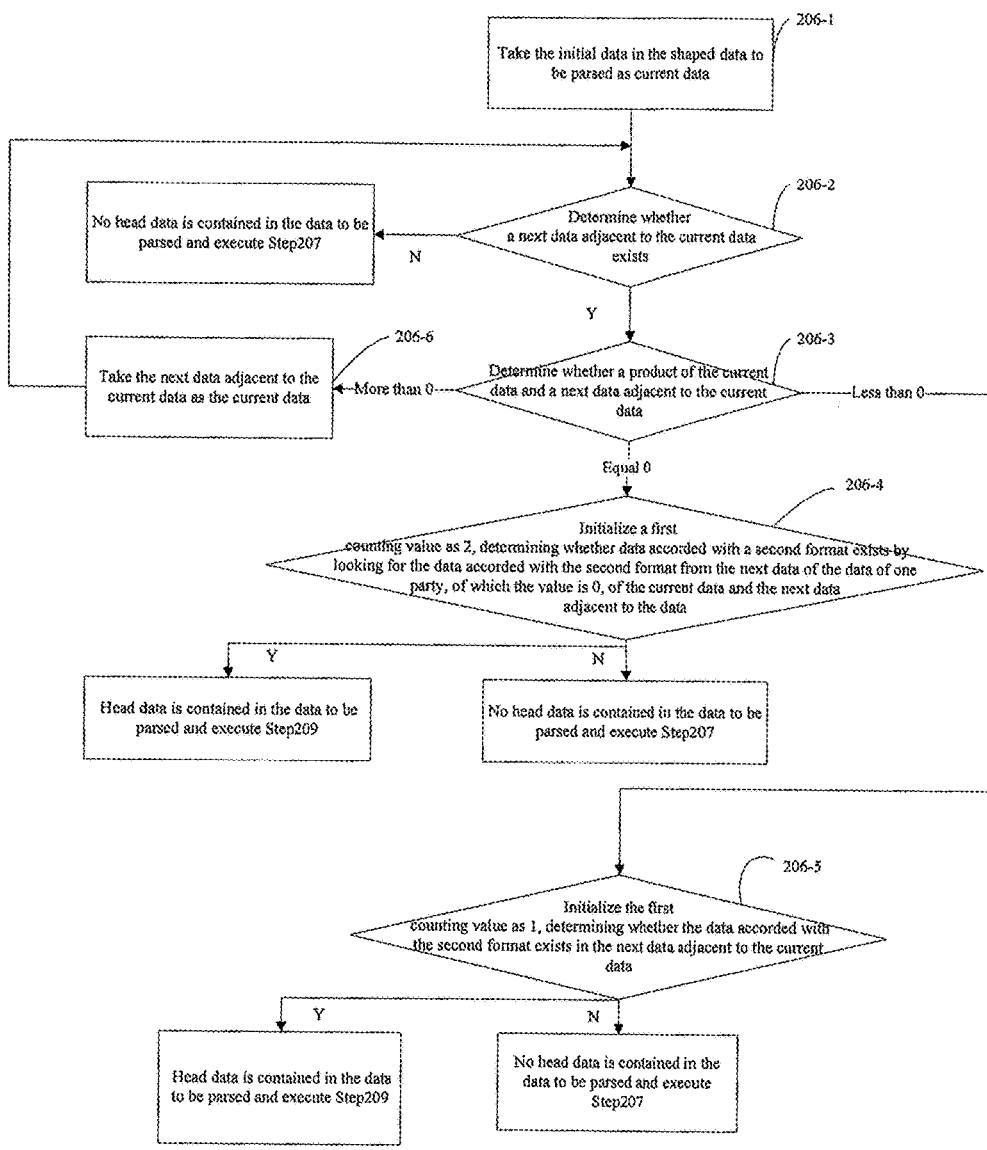
FIG. 6 is a specific flow chart of Step 206 of FIG. 5.
Figure 7:
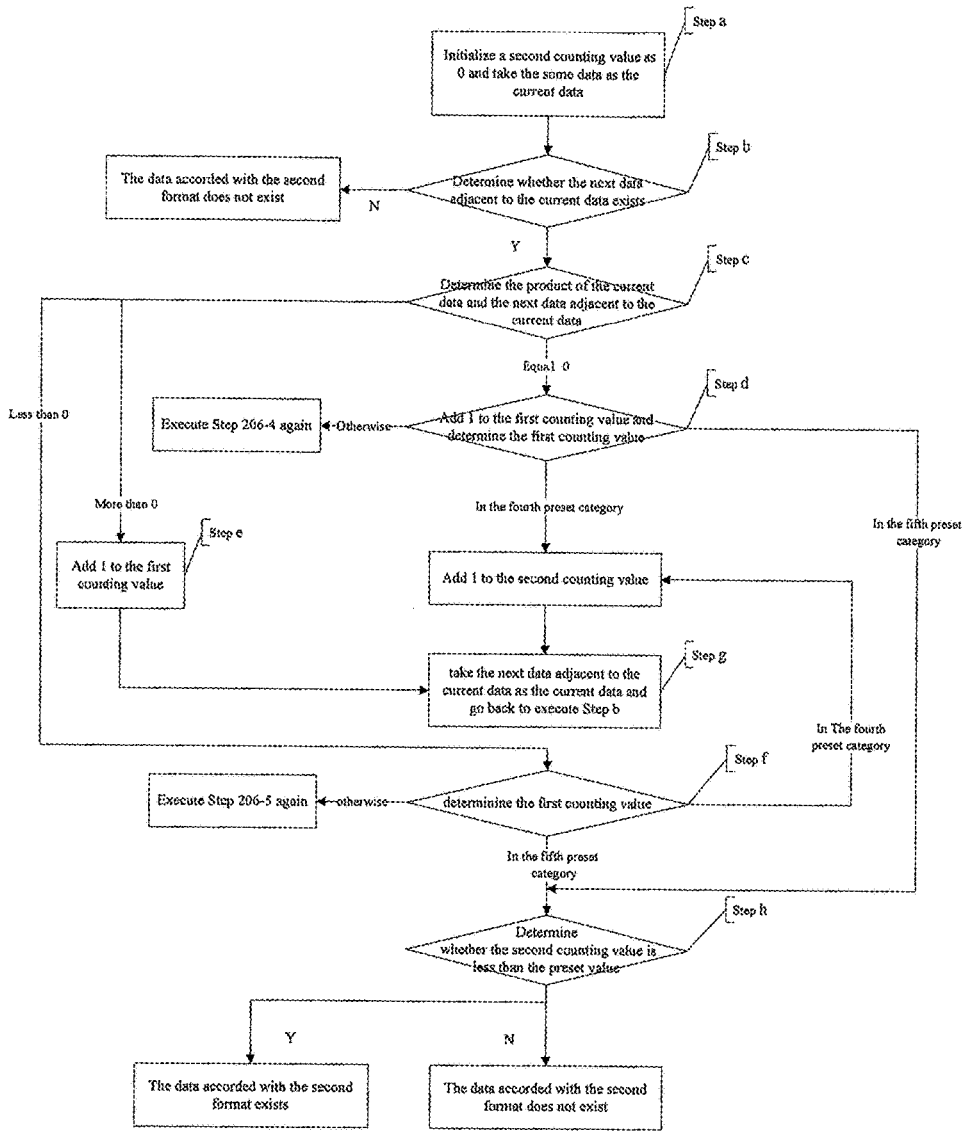
FIG. 7 is a specific flow chart for starting to look for whether data accorded with a second format exists from some data.

Step 206, determine whether head data is contained in the data to be parsed according to the shaped data to be parsed; if yes, execute Step 209; otherwise, execute Step 207;

Specifically, referring to FIG. 6, Step 206 further includes:

Step 206-1, taking the initial data in the shaped data to be parsed as current data;

Step 206-2, determining whether a next data adjacent to the current data exist, if yes, execute Step 206-3; otherwise, no head data is contained in the data to be parsed and execute Step 207;

Step 206-3, determining whether a product of the current data and a next data adjacent to the current data is 0; if the product is equal to 0, execute Step 206-4; if the product is less than 0, execute Step 206-5; if the product is more than 0, execute Step 206-6;

Step 206-4, initializing a first counting value as 2; determining whether data accorded with a second format exist by looking for the data accorded with the second format from the next data of the data of one party, of which the value is 0, of the current data and the next data adjacent to the data; if yes, the head data is contained in the data to be parsed and execute Step 209; otherwise, the head data is not contained in the data to be parsed, execute Step 207;

Step 206-5, initializing the first counting value as 1, determining whether the data accorded with the second format exist in the next data adjacent to the current data, if yes, the head data is contained in the data to be parsed, execute Step 209; otherwise, no head data is contained in the data to be parsed, execute Step 207;

Step 206-6, take the next data adjacent to the current data as the current data, go back to execute Step 206-2;

Further, referring to FIG. 7, determining whether the data accorded with the second format exist by looking for the data accorded with the second format from the beginning of some data specifically includes:

Step a, initializing a second counting value as 0 and taking the some data as the current data;

Step b, determining whether the next data adjacent to the current data exist; if yes, executing Step c; otherwise, the data accorded with the second format does not exist;

Step c, determining the product of the current data and the next data adjacent to the current data; if the product is 0, executing Step d; if the product is more than 0, executing Step e; if the product is less than 0, executing Step f;

Step d, adding 1 to the first counting value and determining the first counting value; if the first counting value is in a fourth preset category, adding 1 to the second counting value and executing Step g; if the first counting value is in the fifth preset category, executing Step h, otherwise, executing 206-4 again;

Step e, adding 1 to the first counting value and executing Step g;

Step f, determining the first counting value; if the first counting value is in the fourth preset category, adding 1 to the second counting value and executing Step g, if the first counting value is in the fifth preset value, executing Step h; otherwise, executing step 206-5 again;

Step g, taking the next data adjacent to the current data as the current data, and going back to execute Step b;

Step h, determining whether the second counting value is less than the preset value; if yes, the data accorded with the second format exist; otherwise, the data accorded with the second format does not exist.

Step 207, determining whether data exist in the first data buffer; if yes, clearing the data in the first data buffer and executing Step 208; otherwise, executing Step 208 directly;

Step 208, discarding the audio data received this time and going back to execute Step 201.

Preferably, the Step 208 further includes storing part of data at the end of the data to be parsed in the first data buffer.

Figure 8:
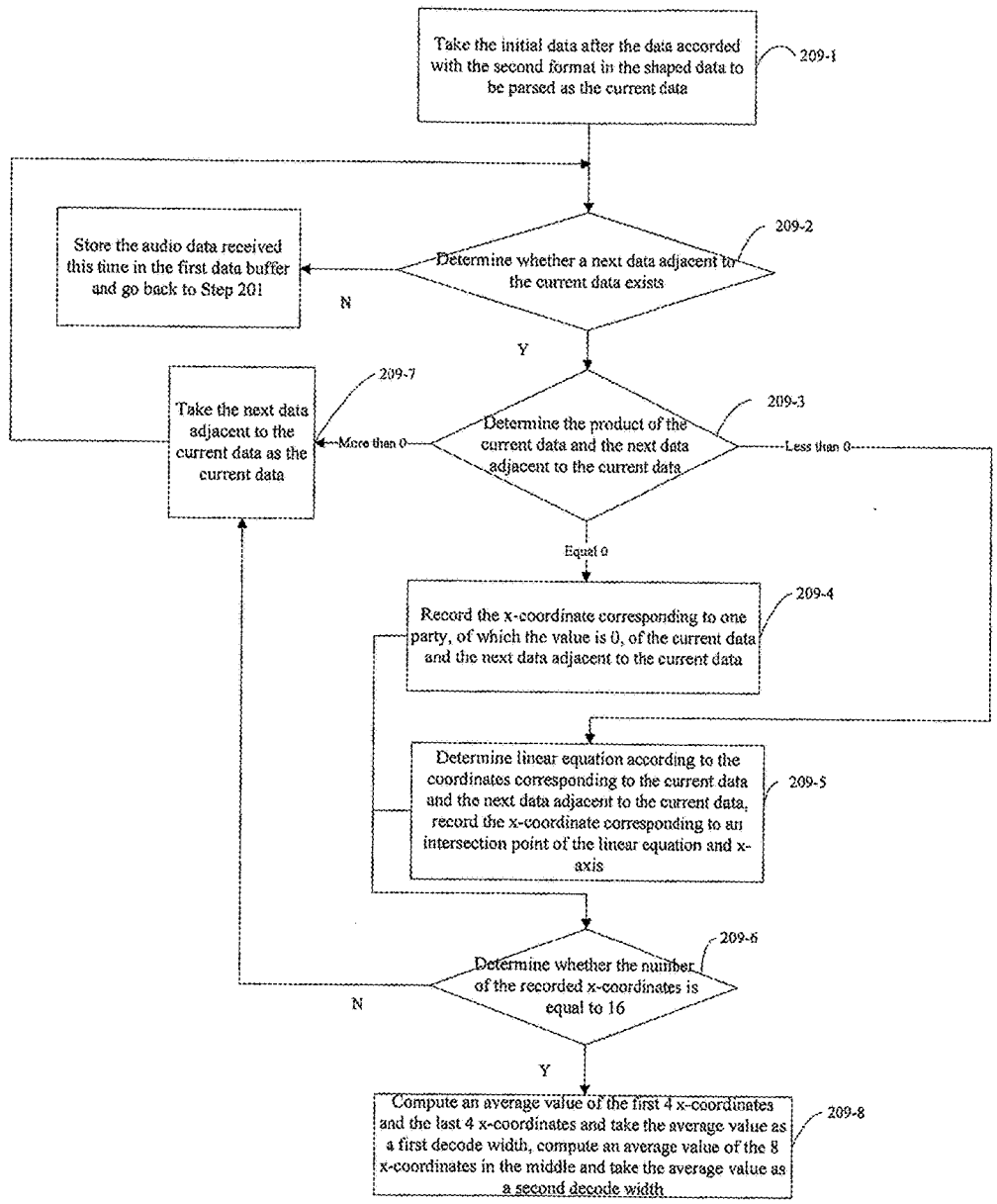
FIG. 8 is a specific flow chart of Step 209 in FIG. 5.

Step 209, obtaining decode width data in the shaped data to be parsed and computing the decode width;

Specifically, decode width data is set after the head data in the audio data is received by the parsing device;

Referring to FIG. 8, Step 209 specifically includes:

Step 209-1, taking the initial data after the data accorded with the second format in the shaped data to be parsed as the current data;

Step 209-2, determining whether a next data adjacent to the current data exist; if yes, executing Step 209-3; otherwise, storing the audio data received this time in the first data buffer and going back to Step 201;

Step 209-3, determining the product of the current data and the next data adjacent to the current data, if the product is equal to 0, executing Step 209-4; if the product is less than 0, executing Step 209-5; if the product is more than 0, executing Step 209-7;

Step 209-4, recording the x-coordinate corresponding to one party, of which the value is 0, of the current data and the next data adjacent to the current data, executing Step 209-6;

Step 209-5, determining linear equation according to the coordinates corresponding to the current data and the next data adjacent to the current data; recording the x-coordinate corresponding to an intersection point of the linear equation and x-axis; executing Step 209-6;

Step 209-6, determining whether the number of the recorded x-coordinates is equal to 16; if yes, executing 209-8; otherwise, executing 209-7;

Step 209-7, taking the next data adjacent to the current data as the current data, and going back to execute Step 209-2;

Step 209-8, computing an average value of the first 4 x-coordinates and the last 4 x-coordinates and taking the average value as a first decode width; computing an average value of the 8 x-coordinates in the middle and taking the average value as a second decode width.

Further, in order to segment head data more accurately, flag data is set between the head data and the decode width data; correspondingly, the Step 209-1 can be replaced with step of taking the initial data after the data corresponding to the flag data in the shaped data to be parsed as the current data.

Step 210, obtain the data length data in the shaped data to be parsed and decode the obtained data; compute the data length according to the decoding result.

Figure 9:
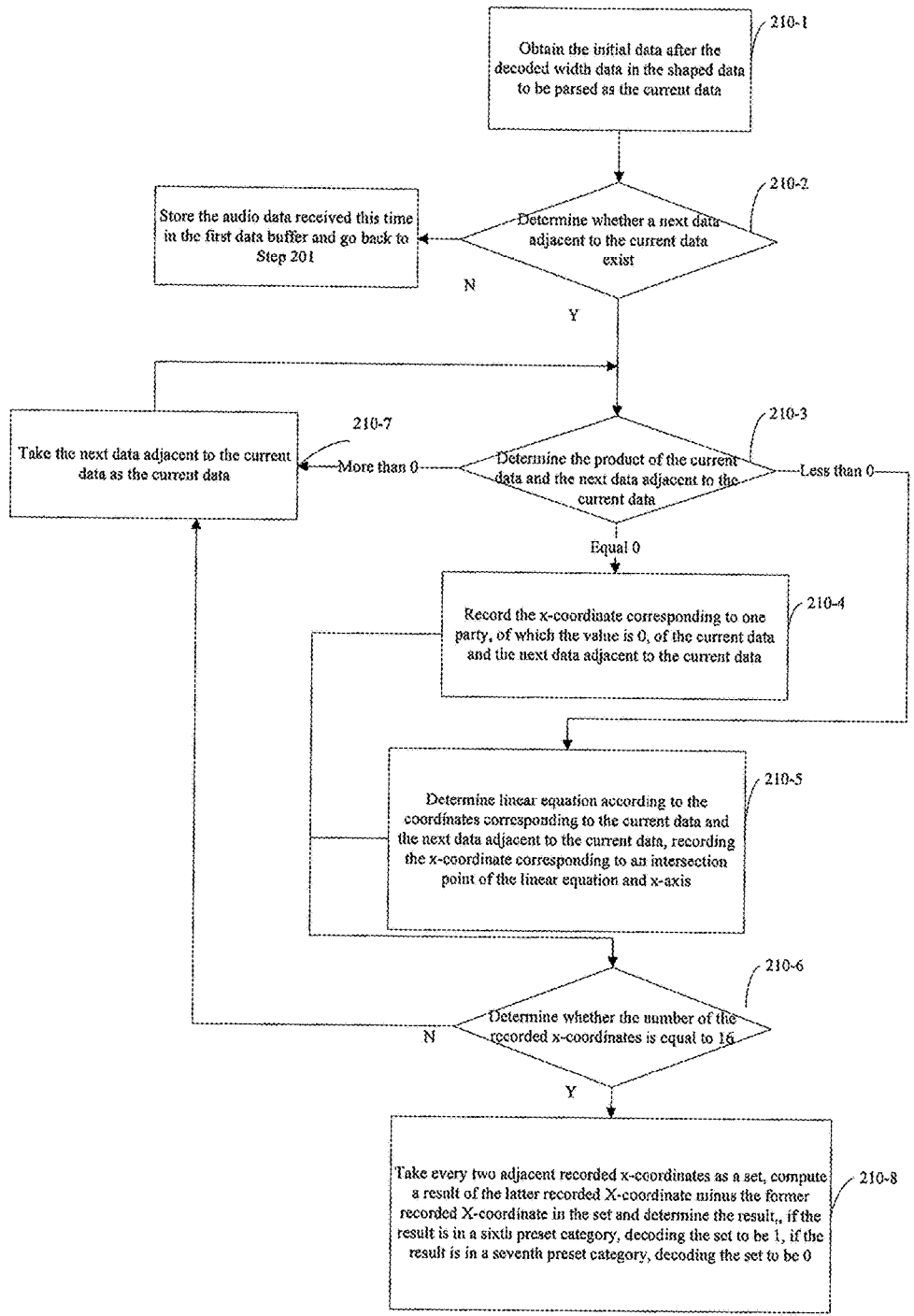
FIG. 9 is a specific flow chart of Step 210 of obtaining data length data from shaped data to be parsed and decoding the obtained data.

Referring to FIG. 9, obtaining the data length data in the shaped data to be parsed and decoding the obtained data further includes:

Step 210-1, obtaining the initial data after the decode width data in the shaped data to be parsed as the current data;

Step 210-2, determining whether a next data adjacent to the current data exist; if yes, execute Step 210-3; otherwise, storing the audio data received this time in the first data buffer and going back to Step 201;

Step 210-3, determining the product of the current data and the next data adjacent to the current data; if the product is equal to 0, executing Step 210-4; if the product is less than 0, executing Step 210-5; if the product is more than 0, executing Step 210-7;

Step 210-4, recording the x-coordinate corresponding to one party, of which the value is 0, of the current data and the next data adjacent to the current data, executing Step 210-6;

Step 210-5, determining linear equation according to the coordinates corresponding to the current data and the next data adjacent to the current data; recording the x-coordinate corresponding to an intersection point of the linear equation and x-axis; executing Step 210-6;

Step 210-6, determining whether the number of the recorded x-coordinates is equal to 16; if yes, executing step 210-8; otherwise, executing step 210-7;

Step 210-7, taking the next data adjacent to the current data as the current data, and going back to execute Step 210-2;

Step 210-8, taking every two adjacent recorded x-coordinates as a set; computing a result of the latter recorded X-coordinate minus the former recorded X-coordinate in the set and determining the result; if the result is in a sixth preset category, decoding the set to be 1; if the result is in a seventh preset category, decoding the set to be 0.

In this case, the sixth preset category is set according to the first decode width, and the seventh preset category is set according to the second decode width.

In Embodiment 2, the Little-Endian byte order is used for data importing, e.g. low bit is at the front and high bit is at the end; for example, if the decoding result is 0 0 0 0 0 0 0 0 0 0 0 0 1 000; actually, 00000000 is 00000000=0x00, 00001000 is 00010000=0x10, the data length is 16 bits.

Step 211, obtain the corresponding data in the shaped data to be parsed according to the data length obtained by computing.

Further, in Embodiment 2, the audio data sent to the parsing device includes check data which is at the end of the audio data.

Figure 10:
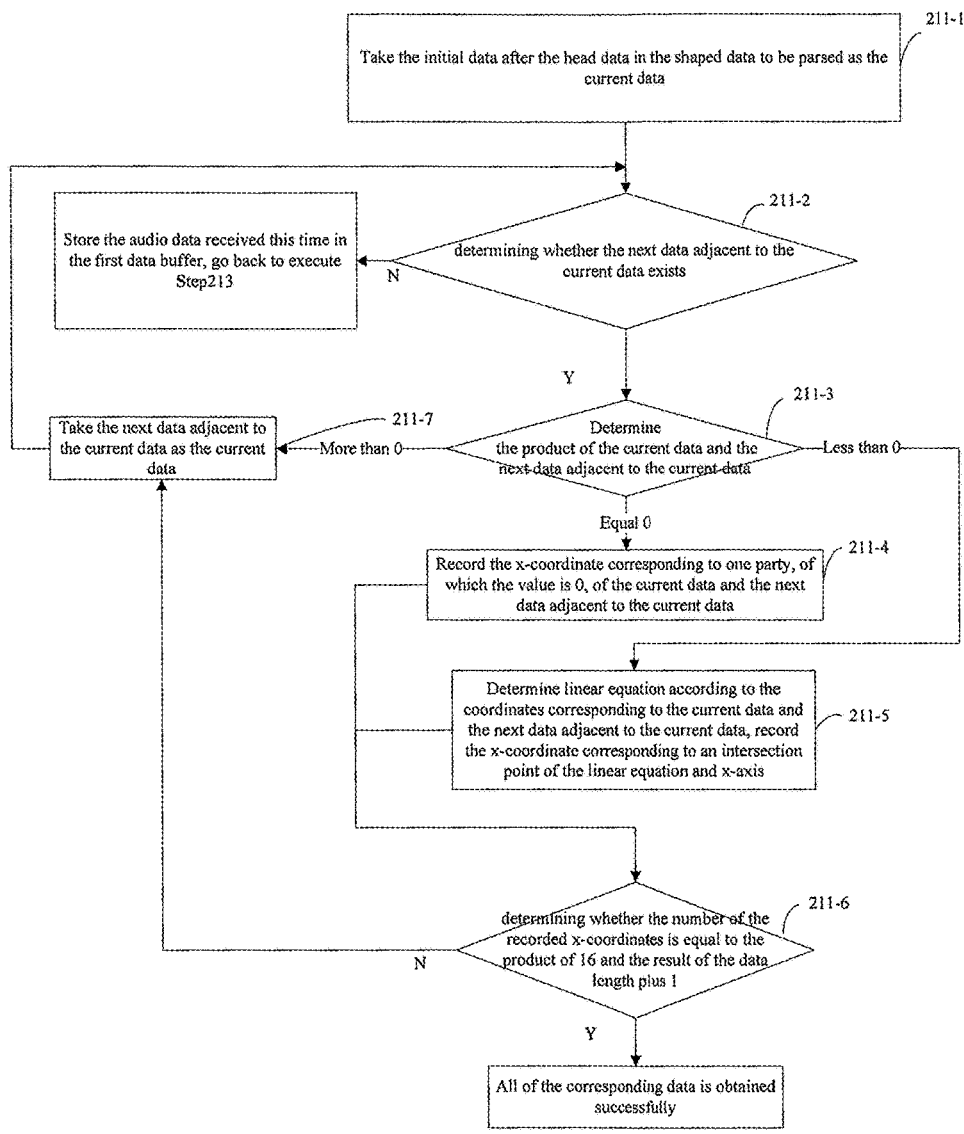
FIG. 10 is a specific flow chart of Step 211 and Step 212 of FIG. 5.

Step 212, determine whether all of the corresponding data is obtained successfully; if yes, executing Step 214; otherwise, executing Step 213;

Further, referring to FIG. 10, Step 211 and Step 212 can be in details as the following:

Step 211-1, taking the initial data after the header data in the shaped data to be parsed as the current data;

Step 211-2, determining whether the next data adjacent to the current data exist; if yes, executing Step 211-3; otherwise, not all of the corresponding data are not obtained successfully, going back to execute Step 213;

Step 211-3, determining the product of the current data and the next data adjacent to the current data; if the product is equal to 0, executing Step 211-4; if the product is less than 0, executing Step 211-5; if the product is more than 0, executing Step 211-7;

Step 211-4, recording the x-coordinate corresponding to one party, of which the value is 0, of the current data and the next data adjacent to the current data, executing Step 211-6;

Step 211-5, determining linear equation according to the coordinates corresponding to the current data and the next data adjacent to the current data, recording the x-coordinate corresponding to an intersection point of the linear equation and x-axis; executing Step 211-6;

Step 211-6, determining whether the number of the recorded x-coordinates is equal to the product of 16 and the result of the data length plus 1; if yes, all of the corresponding data is obtained successfully; otherwise, executing Step 211-7;

Step 211-7, taking the next data adjacent to the current data as the current data, going back to execute 211-2;

Step 213, store the audio data received this time in the first data buffer and go back to execute Step 201;

Further, Step 210, Step 211, Step 212 and Step 213 can be replaced with:

Step 210', determining whether data exist in the second data buffer; if yes, forming the shaped data to be parsed and the data in the second data buffer into the first data and obtaining the stored data length and executing Step 211'; otherwise, taking the shaped data to be parsed as the first data, obtaining the data length data in the shaped data to be parsed and decoding the data length data according to the decode width, computing according to the decoding result to obtain the data length and executing Step 211';

Step 211', obtaining the data corresponding to the first data according to the data length;

Step 212', determining whether all of the corresponding data is obtained successfully; if yes, executing Step 214; otherwise, executing Step 213';

Step 213', storing the audio data received this time in the first data buffer, storing the data, which cannot be parsed to be one byte, at the end of the first time decoded data in a second data buffer and storing the data length; going back to execute Step 201.

Step 214, decoding the obtained data to obtain decoded data;

Step 214 further includes: taking every two adjacent recorded x-coordinates as a set, computing a result of the latter recorded X-coordinate minus the former recorded X-coordinate in the set and determining the result; if the result is in the sixth preset category, decoding the set to be 1; if the result is in the seventh preset category, decoding the set to be 0;

Step 215, form every 8 bits in the second time decoded data into a byte data and check whether the rest byte data is correct according to the last byte data; if yes, execute Step 218; otherwise, execute Step 216;

Step 216, determine whether data exist in the first data buffer; if yes, clear the data in the first data buffer and execute Step 217; otherwise, execute Step 217 directly;

Further, Step 216 further includes: checking the second data buffer; if data exist in the second data buffer, clear the data in the second data buffer and delete the stored data length.

Step 217, discard the audio data received this time and go back to execute Step 201; Step 218, output the rest byte data, clear the first data buffer and go back to execute Step 201.

What described above is only preferable embodiments of the present invention. However, the scope of protection of the present invention is not limited to the embodiments of the present invention. Any changes or substitution which is easily though of should fall into the scope of protection of the present invention. Therefore, the scope of protection of the present invention shall be determined by the appended claims.

The invention claimed is:

1. A method for parsing audio data, comprising:

Step A, receiving, by a parsing device, audio data, determining whether data exist in a first data buffer, if yes, combining the audio data received this time and the data in the first data buffer into data to be parsed; otherwise, taking the audio data received this time as data to be parsed;

Step B, shaping the data to be parsed to obtain the shaped data to be parsed;

Step C, decoding the shaped data to be parsed to obtain a first time decoded data;

Step D, determining whether head data is contained in the data to be parsed according to the first time decoded data, if yes, executing Step E; otherwise, clearing the data in the first data buffer and going back to execute Step A if data exist in the first data buffer, or going back to execute Step A directly if no data exist in the first data buffer;

Step E, obtaining data length, and obtaining a corresponding data unit in the first data according to the obtained data length;

Step F, determining whether all of the corresponding data units are obtained successfully, if yes, executing Step G; otherwise, storing the audio data received this time in the first data buffer; and going back to execute Step A;

Step G, performing a second time decoding on the obtained data units, obtaining corresponding byte data according to decoding result; check whether the rest of the bytes are correct according to the last byte; if yes, outputting the rest of the bytes; otherwise, clearing the data in the first data buffer and going back to execute Step A if data exist in the first data buffer or going to execute Step A directly if no data exist in the first data buffer.

2. The method of claim 1, wherein Step D further comprises, when the head data is not contained in the data to be parsed, storing part of data at the end of the data to be parsed in the first data buffer.

3. The method of claim 1, wherein Step F further comprises, when obtaining all of the corresponding data units is not successful, storing the data length and storing the data at the end of the first time decoded data which cannot be parsed into one byte in a second data buffer;

Step E specifically comprises:

Step E1, determining whether data exist in the second data buffer, if yes, going to Step E2; otherwise, go to Step E3;

Step E2, combining the first time decoded data and the data in the second data buffer into a first data, obtaining the stored data length and executing Step E4;

Step E3, taking the first decoding data as the first data, obtaining the data unit corresponding to the data length in the first time decoded data and performing the second time decoding on the data unit, obtaining data length by computing according to the decoding result and executing Step E4;

Step E4, obtaining a corresponding data unit in the first data according to the data length;

when the rest of the bytes are incorrect, Step G further comprises: checking the second data buffer; if data exist in the second data buffer, clearing the data in the second data buffer and deleting the stored data length.

4. The method of claim 1, wherein Step C, Step D, Step E, Step F and Step G are replaced with:

Step C', determining whether head data is contained in the data to be parsed according to the shaped data to be parsed, if yes, executing Step D'; otherwise, clearing the data in the first data buffer and going back to execute Step A if the data exist in the first data buffer, or going back to execute Step A directly if no data exist in the first data buffer;

Step D', obtaining decode width data in the shaped data to be parsed and computing the decode width;

Step E', obtaining the data length and obtaining corresponding data in the first data according to the obtained data length;

Step F', determining whether all of the corresponding data is obtained successfully, if yes, executing Step G'; otherwise, storing the audio data received this time in the first data buffer and going back to execute Step A;

Step G', decoding the obtained data according to the decode width, and obtaining corresponding byte data according to the decoding result; checking whether the rest of the bytes are correct according to the last byte; if yes, outputting the rest of the bytes, otherwise, clearing the data in the first data buffer and going back to execute Step A if data exist in the first data buffer; or going back to execute Step A directly if no data exist in the first data buffer.

5. The method of claim 4, wherein, when the head data is not contained in the data to be parsed, Step C' further comprises storing part of data at the end of the data to be parsed into the first data buffer.

6. The method of claim 4, wherein, if not all of the corresponding data units are obtained successfully, Step F' further comprises: storing the data length and storing the data, which cannot be parsed into one byte of data, at the end of the first time decode data in the second data buffer;

Step E' specifically comprises:

Step E1', determining whether data exist in the second data buffer, if yes, executing Step E2', otherwise, executing Step E3';

Step E2', combining the shaped data to be parsed and the data in the second data buffer into the first data, obtaining the stored data length and executing Step E4';

Step E3', taking the shaped data to be parsed as the first data, obtaining the data length in the shaped data to be parsed and decoding the data length according to the decode width, obtaining the data length by computing according to the decoding result and executing Step E4';

Step E4', obtaining corresponding data in the first data according to the data length;

when the rest of bytes are not correct, Step G' further comprises: checking the second data buffer, clearing the data in the second data buffer if data exist in the second data buffer and deleting the stored data length.

7. The method of claim 1 or 4, wherein, before the parsing device receiving the audio data, the method comprises: performing, by the parsing device, device initialization, determining whether device initialization is successful, if yes, creating recording thread and starting receiving audio data; otherwise, prompting that the device initialization is failed.

8. The method of claim 1 or 4, wherein shaping the data to be parsed comprises:
1) allocating a block of new memory of which the size is the same as the data length of the data to be parsed;
2) determining whether unprocessed data exist in the data to be parsed, if yes, executing step 3); otherwise, executing 4);
3) obtaining a base line and determining whether obtain the base line successfully, if yes, storing a difference between current data and the base line in the new memory and going back to execute 2); otherwise, storing the current data in the new memory, and going back to execute step 2); and
4) replacing the data to be parsed with the data in the new memory, obtaining the shaped data to be parsed and releasing the new memory.

9. The method of claim 8, wherein obtaining the base line further comprises:
obtaining a preset number of data before the current data and a preset number of data after the current data, looking for the maximum value and the minimum value in the obtained data and the current data, computing an average value of the maximum value and the minimum value and the average value is the base line.

10. The method of claim 1, wherein Step C specifically comprises:
1) taking the initial data in the shaped data to be parsed as the current data;
2) determining whether a next data adjacent to the current data exist, if yes, executing step 3); otherwise, executing step 5);
3) determining the product of the current data and the next data adjacent to the current data, if the product is 0, recording the value of the X-coordinate corresponding to one party, of which the value is 0, of the current data and the next data adjacent to the current data, and executing step 4); if the product is more than 0, executing step 4); if the product is less than 0, determining a linear equation according to the coordinates corresponding to the current data and the next data adjacent to the current data, and recording the value of the X-coordinates corresponding to an intersection point of the linear equation and the X-axis and executing step 4);
4) taking the next data adjacent to the current data as current data, and going back to step 2); and
5) taking every two adjacent recorded x-coordinates as a set, computing a result of the latter recorded X-coordinate minus the former recorded X-coordinate in the set and determining the result, if the result is in a first preset category, decoding the shaped data to be parsed to be a first value; if the result is in a second preset category, decoding the shaped data to be parsed to be a second value; if the result is in a third preset category, decoding the shaped data to be parsed to be a third value.

11. The method of claim 10, wherein determining whether the head data is contained in the data to be parsed according to the first time decoded data comprises:
determining whether data accorded with a first format exist in the first decoded data, if yes, the head data is contained in the data to be parsed; otherwise, the head data is not contained in the data to be parsed.

12. The method of claim 11, wherein the data accorded with the first format is consecutive the first values of which the number is no less than a preset number.

13. The method of claim 10, wherein performing the second time decoding comprises:
decoding the second value into 1 and decoding the third value into 0.

14. The method of claim 4, wherein determining whether the head data is contained in the data to be parsed according to the shaped data to be parsed comprises:
1) taking the initial data of the shaped data to be parsed as the current data;
2) determining whether the next data adjacent to the current data exist, if yes, executing step 3); otherwise, the head data is not contained in the data to be parsed;
3) determining the product of the current data and the next data adjacent to the current data, if the product is equal to 0, executing step 4); if the product is less than 0, executing step 5); if the product is more than 0, taking the next data adjacent to the current data as the current data, and going back to execute step 2);

4) initializing a first counting value to 2, determining whether data accorded with a second format exist by looking for the data accorded with the second format from the next data of the data of one party, of which the value is 0, of the current data and the next data adjacent to the data, if yes, the head data is contained in the data to be parsed; otherwise, the head data is not contained in the data to be parsed; and 5) initializing the first counting value to 1, determining whether the data accorded with the second format exist in the next data adjacent to the current data, if yes, the head data is contained in the data to be parsed; otherwise, the head data is not contained in the data to be parsed.

15. The method of claim 14, wherein the step 4) comprises initializing the first counting value to 2; the step 5) comprises initializing the first counting value to 1;
determining whether the data accorded with the second format exist by look for the data accorded with the second format from the beginning of some data, wherein some data is the next data of the data of one party, of which the value is 0, of the current data and the next data adjacent to the current data, or the next data of the current data which comprises:
a) initializing a second counting value to 0 and taking the some data as the current data;
b) determining whether the next data adjacent to the current data exist, if yes, executing step c); otherwise, the data accorded with the second format does not exist;
c) determining the product of the current data and the next data adjacent to the current data, if the product is 0, executing step d); if the product is more than 0, executing step e); if the product is less than 0, executing step f);
d) adding 1 to the first counting value and determining the first counting value, if the first counting value is in a fourth preset category, adding 1 to the second counting value and executing step g); if the first counting value is in the fifth preset category, executing step h), otherwise, executing step 4) again;
e) adding 1 to the first counting value and executing step g);
f) determining the first counting value, if the first counting value is in the fourth preset category, executing step g), if the first counting value is in the fifth preset value, executing step h); otherwise, executing step 5) again;
g) taking the next data adjacent to the current data as the current data, going back to execute step b); and
h) determining whether the second counting value is less than the preset value, if yes, the data accorded with the second format do not exist; otherwise, the data accorded with the second format exist.

16. The method of claim 4, wherein the Step D' specifically comprises:
1) taking the initial data after the head data in the shaped data to be parsed as the current data;
2) determining whether the next data adjacent to the current data exist, if yes, executing step 3), otherwise, storing the audio data received this time in the first data buffer, and going back to execute Step A);

3) determining the product of the current data and the next data adjacent to the current data, if the product is equal to 0, executing step 4); if the product is less than 0, executing step 5); if the product is more than 0, executing step 7);

4) recording the x-coordinate corresponding to one party, of which the value is 0, of the current data and the next data adjacent to the current data, and executing step 6);

5) determining linear equation according to the coordinates corresponding to the current data and the next data adjacent to the current data, recording the x-coordinate corresponding to an intersection point of the linear equation and x-axis; executing step 6);

6) determining whether the number of the recorded x-coordinates is equal to 16, if yes, executing step 8); otherwise, executing step 7);

7) taking the next data adjacent to the current data as the current data, and going back to execute step 2); and 8) computing an average value of the first 4 x-coordinates and the last 4 x-coordinates and taking the average value as a first decode width, computing an average value of the 8 x-coordinates in the middle and taking the average value as a second decode width.

17. The method of claim 6, wherein obtaining the data length data in the shaped data to be parsed and decoding the data length data according to the decoding width comprises:
s1) obtaining the initial data after the decoding width data in the shaped data to be parsed and taking the initial data as the current data;
s2) determining whether next data adjacent to the current data exists, if yes, executing step s3); otherwise, storing the audio data received this time in the first data buffer, and going back to execute Step A;
s3) determining a product of the current data and the next data adjacent to the current data, if the product is equal to 0, executing step s4); if the product is less than 0, executing step s5); if the product is more than 0, executing step s7);
s4) recording the x-coordinate corresponding to one party, of which the value is 0, of the current data and next data adjacent to the current data, executing step s6);
s5) determining the linear equation according to the current data and the next data adjacent to the current data, recording the x-coordinate of the intersection point of the linear equation and the x-axis, executing step s6);
s6) determining whether number of the recorded x-coordinates is equal to 16, if yes, executing step s8); otherwise, executing step s7);
s7) taking the next data adjacent to the current data as the current data, and going back to execute s2; and
s8) taking every two neighbored x-coordinates as a set, computing result of the latter x-coordinate minus the former x-coordinate, determining the result; if the result is in a sixth preset category, decoding the data to be parsed to be 1; if the result is in the seventh preset category, decoding the data to be parsed to be 0;
the sixth preset category is determined according to the first decode width, and the seventh preset category is determined according to the second decode width.

* * * * *